July 3, 1945.   H. R. ELLINWOOD   2,379,568
CONDUIT SUPPORTING CLIP
Original Filed Aug. 24, 1940
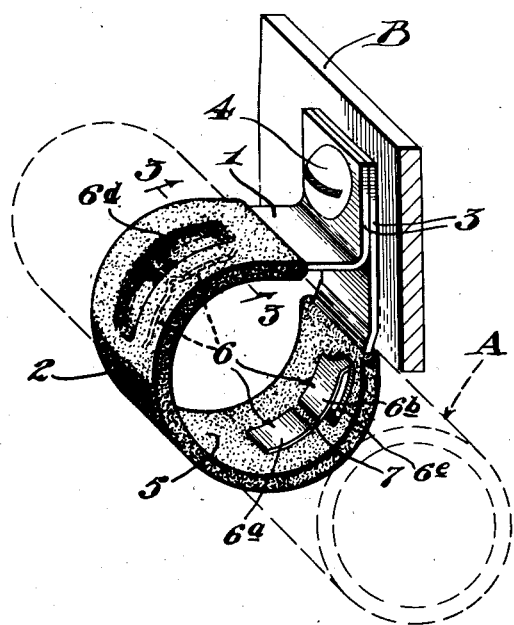
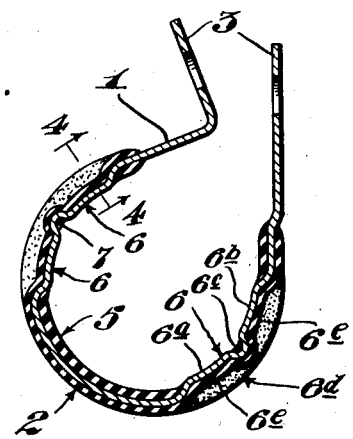
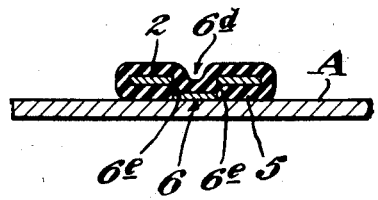
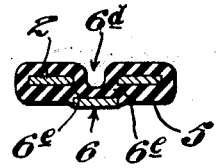
Inventor
Herman Ray Ellinwood
By
Attorney Patented July 3, 1945

2,379,568

UNITED STATES PATENT OFFICE 2,379,568

CONDUIT SUPPORTING CLIP

Herman Ray Ellinwood, Burbank, Calif., assignor to Adel Precision Products Corp., a corporation of California Original application August 24, 1940, Serial No. 354,105. Divided and this application April 10, 1942, Serial No. 438,487

5 Claims. (Cl. 174—40)

This invention relates to aircraft conduit supporting clips of the type shown in United States Letters Patent No. 2,215,283, issued on September 17, 1940, to Paul W. Adler.

The present application is a division of my pending application Serial Number 354,105 filed August 24, 1940, for Conduit supporting clip, Patent No. 2,279,866 issued April 14, 1942.

An object of the present invention is to provide a line supporting clip for the purpose hereinbefore noted, which will afford a reliable, full-cushioned and thoroughly electrically "grounded" connection of a conduit line with the metal structure of the airplane on which the clip is mounted, and maintain these desirable qualities over long periods of time regardless of vibration.

A further object is to provide a clip of the character described in which the cushion is carried so that it will not become displaced and fail its purpose incident to vibration or relative movement of the line and clip.

A further purpose is to provide a line supporting clip such as described in which the grounding strip or element may be formed as an integral part or permanently connected part of the clip for increasing the ruggedness of the clip and directly contacting the conduit.

Another object if my invention is to provide a clip of the character described wherein a bonding strip is formed integrally with or fixed to the strap and protrudes through the cushion for a yielding contact with the conduit in such manner as to more effectively and directly bond the conduit to the strap without impairing the cushioning effect.

Another object of the invention is to provide a conduit clip of the character described wherein the metal strap is provided at opposite points in the loop portion thereof with bonding strips which protrude through the cushion and are of such formation and arrangement as to provide a balanced clip construction, with the conduit uniformly contacted by and seated on the cushion and bonding elements to best support and bond it without undue wear on or failure of the clip and conduit.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a clip embodying my invention and when in use;

Fig. 2 is a vertical sectional view of the clip of Fig. 1, as when detached;

Fig. 3 is a cross sectional view taken on the line 3—3 of Fig. 1;

Fig. 4 is a cross sectional view taken on the line 4—4 of Fig. 2.

Referring to the drawing more specifically, the clip embodying the present invention comprises a bendable resilient metal strap 1 which is adapted to embrace a metallic conduit line A, with its loop portion 2 surrounding the line while its apertured terminal portions 3 are extended angularly from the loop portion and secured in abutting relation to one another and a metallic supporting structure B, by means of a screw 4 or other suitable fastening, the supporting structure B representing, for example, a metallic structural part of an airplane.

A line embracing cushion 5 is carried by the strap so as to lie between the loop portion 2 and the conduit in yielding contact with both, whereby a full cushioned suport for the line is provided. This cushion is made of resilient rubber or other similar resilient and compressible material and preferably is tubular and surrounds the loop portion to prevent displacement thereof from the strap as might occur if the cushion were otherwise formed or secured on the strap. The cushion may be dipped in molten rubber or the like in such manner as to form the desired cushion on the strap.

In accordance with the present invention a resilient metallic grounding or bonding member 6 is fixed to the loop 2, for example, by being formed integrally therewith. This permanently affixed member 6 is constructed and protruded through the cushion in such manner that it will yieldingly contact the conduit A as shown in Fig. 3, while the cushion is at the same time effectively seated against the conduit. As will be hereinafter described a plurality of the bonding members 6 may be provided.

It should be noted that the bonding member 6 will be forced into or embedded in the material of the cushion so as to lie substantially flush therewith as shown in Fig. 3, when the clip is clamped upon the conduit as indicated in Fig. 1 and this arrangement insures a yielding yet positive contact of the member 6 with the conduit without interfering with the desired cushioning and vibration damping action of the cushion.

As here shown the bonding member 6 is upset or struck inwardly from an intermediate part of the loop portion 2 of the strap 1 so that it takes the form of a narrow strip having its ends integral with and in the plane of the strap proper as shown in Fig. 2, while spaced portions 6a and 6b thereof between said ends, protrude through the cushion 5 for contact with the conduit in the manner hereinbefore described.

To provide for tensioning of the member 6 and a ready flexure thereof so that the portions 6a and 6b will be formed and will yieldingly contact the conduit, said member is bent as at 6c toward the strap proper and approximately centrally of its ends. As here shown the bend 6c is embedded in or extends into the cushion 5, preferably so that there is provided as shown in Figs. 1 and 2 a web 7 of the cushion material separating the portions 6a and 6b. This web prevents chafing and wear, yet does not interfere with the bonding or flexing of member 6 at said bend, which latter forms a hinge joint between the portions 6a and 6b.

It is now seen that the member 6 is arcuate and substantially follows the contour of the cushion and conduit, paritcularly the portions 6a and 6b which form in effect, spaced bonding strips or loops for simultaneously yieldably contacting the conduit. These portions 6a and 6b, except at their ends, lie upon and become pressed into the cushion as indicated in Fig. 3 when the clip is clamped on the conduit, the inherent resiliency of the member 6, the added resiliency afforded by the cushion, the bend 6c and the cushion portions adjacent the bend, insuring a yielding and cushioning action and a good electrical bond between the strap and conduit, without undue wear, chafing, etc. which might be expected due to the direct contact of the integral bonding strip (parts 6a and 6b) with the conduit.

Preferably the strap after having the bonding member 6 struck therefrom or formed thereon, is dipped in the material for forming the cushion in such manner that the strap becomes well coated and cushioned as to the loop portion 2 but not the terminal portions 3 nor the bonding strip portions 6a and 6b, the bend 6c being coated and therefore covered by the web 7 as herebefore stated.

In forming the cushion in the manner hereinbefore noted a groove or depression is formed thereon at 8d in the outer face of the strap where the member 6 is struck or upset and this contoured formation increases the resiliency of the cushion adjacent and opposite the portions 6a and 6b, and between said portions and the strip proper provides resilient supporting webs therefor.

I may as here shown provide identical bonding members 6 at opposite sides or points in the loop portion 2 to insure an effective cushioning and bonding action and better balance the clip, the conduit being in this case "suspended" between the two resilient bonding members while seated on the cushion and therefore uniformly contacted and supported in such manner as to achieve uniformity in the gripping and bonding of the conduit and avoid "spot" wear thereon.

It should be noted that the present invention includes the provision of a metallic bonding strip which is fixed to the loop portion of the metal strap at a point beneath and covered by the cushion to protect the electrical bond between the strip and the strap. In other words, the strip and strap are in fixed electrical connection with one another at a point between the ends of the cushion and the ends of the loop portion of the strap which point is covered by the cushion, while another portion of strip is exposed on the cushion and between the ends of the cushion for contact with the conduit.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a clip for supporting and grounding a metallic conduit line, a metal line-embracing member adapted to be mounted on and contacted with a metallic supporting structure, a line-embracing cushion of insulation material mounted on said member, and a resilient bonding member constituting an intermediate part of the first recited member and protruding through a portion of said cushion for contact with a conduit line embraced by said cushion.

2. In a clip for supporting and grounding a metallic conduit, a metal strap having a loop portion for embracing a conduit line, terminal portions adapted to be attached to a metallic supporting structure, a cushion of insulation material lining said loop portion, a metal bonding strip formed integral at one end with said loop portion and protruding through the cushion for contact with the conduit line, and a bend formed in said strip affording a flexure point therein.

3. In a clip for supporting and grounding a metallic conduit, a metal strap having a loop portion for embracing a conduit line, terminal portions adapted to be attached to a metallic supporting structure, a cushion of insulation material lining said loop portion, a metal bonding strip formed integral at one end with said loop portion and protruding through the cushion for contact with the conduit line, and a bend formed in said strip affording a flexure point therein, the portion of strip containing said bend being covered by said cushion.

4. In a clip for supporting and grounding a metallic conduit, a metal strap having a loop portion for embracing a conduit line, terminal portions adapted to be attached to a metallic supporting structure, a cushion of insulation material lining said loop portion, a metal bonding strip formed integral at one end with said loop portion and protruding through the cushion for contact with the conduit line, and a bend formed in said strip affording a flexure point therein, the portion of the strip containing said bend being approximately centrally of the ends of the strip and covered by said cushion.

5. In a clip for supporting and grounding a conduit, a metal strap having a loop portion for embracing a conduit line, and terminal portions adapted to be attached to a metallic supporting structure, a cushion of insulation material lining said loop portion, and portions of said strap being struck inwardly at spaced points along the loop portion and protruding through the cushion to provide bonding strips disposed to contact the conduit embraced by said cushion.

HERMAN RAY ELLINWOOD.